(12) United States Patent
Fransson et al.

(10) Patent No.: US 7,506,507 B2
(45) Date of Patent: *Mar. 24, 2009

(54) ARRANGEMENT AND A METHOD FOR CONTROLLING A WORK VEHICLE

(75) Inventors: Patrik Fransson, Kumla (SE); Kjell Sjogren, Eskiltuna (SE); Stefan Harald Salomonsson, Maggie Valley, NC (US); Bo Vigholm, Stora Sundby (SE)

(73) Assignee: Volvo Construction Equipment Holding Sweden AB, Eskilstuna (SE)

( * ) Notice: Subject to any disclaimer, the term of this patent is extended or adjusted under 35 U.S.C. 154(b) by 453 days.

This patent is subject to a terminal disclaimer.

(21) Appl. No.: 11/161,189

(22) Filed: Jul. 26, 2005

(65) Prior Publication Data

US 2006/0018765 A1    Jan. 26, 2006

Related U.S. Application Data

(60) Provisional application No. 60/521,946, filed on Jul. 26, 2004.

(51) Int. Cl.
*F16D 31/02* (2006.01)

(52) U.S. Cl. .......................................... 60/452; 60/443

(58) Field of Classification Search ............... 60/421, 60/443, 445, 449, 452, 465
See application file for complete search history.

(56) References Cited

U.S. PATENT DOCUMENTS

| | | | |
|---|---|---|---|
| 4,335,577 A | 6/1982 | Lobmeyer et al. | |
| 4,802,336 A * | 2/1989 | Mayr et al. ................... | 60/452 |
| 5,481,875 A * | 1/1996 | Takamura et al. ............ | 60/452 |
| 6,109,030 A * | 8/2000 | Geringer ...................... | 60/452 |
| 6,644,429 B2 | 11/2003 | Evans et al. | |
| 2007/0283688 A1 | 12/2007 | Vigholm et al. | |

* cited by examiner

*Primary Examiner*—Michael Leslie
(74) *Attorney, Agent, or Firm*—Novak Druce + Quigg LLP

(57) ABSTRACT

Method and arrangement for controlling a work vehicle that includes a hydraulic system (22) having at least one pump (18,180) and at least one actuator (4,5,8,9,10) operatively driven by hydraulic fluid delivered from the pump and at least a first pump (18) is a variable displacement pump. The system (22) is of the load-sensing type in that pump displacement is controlled by a pilot pressure representing a load exerted on the system. The arrangement includes means (63) for reducing the pilot pressure delivered to the first pump (18) so that the first pump displacement is regulated down when there is a need for limiting hydraulic power consumption.

25 Claims, 3 Drawing Sheets

ARRANGEMENT AND A METHOD FOR CONTROLLING A WORK VEHICLE

CROSS-REFERENCE TO RELATED APPLICATIONS

The present application claims the benefit of U.S. Provisional Application No. 60/521,946 filed 26 Jul. 2004. Said application is expressly incorporated herein by reference in its entirety.

FIELD OF THE INVENTION

The present invention relates to an arrangement for controlling a work vehicle that includes a hydraulic system. The hydraulic system comprises at least one pump and at least one actuator operatively driven by hydraulic fluid delivered from the pump, and of the several possible pumps, at least one is a variable displacement pump. The system is of a load-sensing type in that the pump displacement is controlled by a pilot pressure representing a load exerted on the system.

The pump is normally operatively driven by an internal combustion engine arranged for propelling the work vehicle.

The term work vehicle comprises different types of material handling vehicles like construction machines, such as wheel loaders, backhoe loaders, motor graders and excavators. The invention will be described below using the example of a wheel loader. This should, however, only be regarded as an exemplary or preferred application.

The actuator may be a linear actuator in the form of a hydraulic cylinder. A wheel loader comprises (includes) several such hydraulic cylinders in order to perform certain functions. A first pair of hydraulic cylinders is arranged for turning the wheel loader. Further, there are hydraulic cylinders provided for lifting a load arm unit and tilting an implement, for example a bucket arranged on the load arm unit.

A load sensing hydraulic system of this nature is characterized by the fact that an operating condition of the load can be sensed and then the output pressure of the pump is controlled so that it exceeds the load pressure existing in the hydraulic actuator by a predetermined differential. More specifically, the pressure (an LS signal) from the hydraulic cylinder for the load is sensed via a shuttle valve and via an activated control valve unit associated with the hydraulic cylinder for the load. The pump then delivers a hydraulic fluid flow to the hydraulic cylinder, the level of which depends on the extent to which the activated control valve unit is operated.

In order for the work vehicle to function well, the engine, transmission and hydraulic system must be balanced with regard to available power and output power. It is difficult to find an engine that exactly manages the desired power outputs at different engine speeds. The problem with different output power demand is particularly pronounced at low engine speeds. If the driver utilizes the power from the engine at low engine speeds to drive the vehicle's half shafts at the same time as the hydraulic system is activated, then there is a risk that the engine will cut out or that the engine will "stick;" that is, it will not be able to increase the engine speed when the driver depresses the accelerator pedal. The driver can, of course, adjust the power consumption via various controls when he senses a loss of engine speed, but this can be problematical, particularly when the engine suddenly cuts out. Further, even skilled drivers overcompensate and therefore unnecessarily reduce the amount of hydraulic work the hydraulic system is truly capable of performing. As a result, machine productivity is reduced.

BACKGROUND OF THE INVENTION

There are known arrangements which are adapted to relieve the engine load by reducing pump displacement when there is a risk for stalling the engine.

In U.S. Pat. No. 6,644,429, engine speed or engine torque is sensed and the pump displacement is reduced to zero for certain engine speed or engine torque limit values. A left and right solenoid is controlled by a controller and adapted to position the swash plates on the pumps.

In U.S. Pat. No. 4,335,577, engine speed is sensed and the pump displacement is reduced to zero for a certain engine speed limit value. The pump is short-circuited so that it regulates down; i.e., the pump output pressure is conveyed directly to the load-sensing conduit and the pressure is increased until the pump maximum pressure limitation is reached. A disadvantage is that when a higher flow is used for a function, the pump may stick on maximum displacement and cannot increase the pressure to the maximum level. The pump will then continue to pump with full flow and not maximum pressure although it is short-circuited.

SUMMARY OF THE INVENTION

A purpose of the invention is to achieve an alternative control arrangement for a work vehicle with a load-sensing hydraulic system that creates conditions for limiting the hydraulic power to relieve engine load, especially when there is a risk for stalling the engine. Further, the arrangement should be cost-efficient in operation and/or to install in the work vehicle.

This purpose is achieved in that the arrangement comprises means for reducing the pilot pressure delivered to the first pump so that the first pump displacement is regulated down when there is a need for limiting hydraulic power consumption. More specifically, the load signal delivered to the first pump is reduced to a pressure level below the load pressure resulting in the displacement of the first pump being regulated down to zero output. Thus, the load sensing signal from the hydraulic cylinder is manipulated before reaching the first pump.

More specifically, the pump displacement is reduced by pressure control. This arrangement may easily be introduced in a conventional load-sensing system.

Further, the arrangement is adapted to sense a reduction of a value of an operational state of the vehicle's driveline and react accordingly; for example, a reduction in the engine speed is detected resulting from excessive hydraulic loads and in turn the pressure reducing means is controlled based on the detected value.

According to a preferred embodiment, the means for reducing the pilot pressure to the first pump is adapted to reduce the pilot pressure to the first pump to such an extent that the first pump does not deliver any hydraulic fluid flow. Thus, the first pump is completely destroked. This is particularly advantageous when there is more than one pump delivering hydraulic fluid to the actuator.

In the case that the hydraulic system comprises at least two variable displacement pumps for delivering hydraulic fluid to said actuator the displacement of a second pump is preferably controlled by a pilot pressure representing the load exerted on the system in a non-manipulated form. Thus, only the input pilot pressure signal to the first pump is manipulated. Existing load-sensing hydraulic systems may easily and cost-efficiently be amended for achieving the limitation of the hydraulic power to relieve engine load in this way.

According to a preferred embodiment, the arrangement comprises means for detecting an operational state of a driveline of the work vehicle and means connected to the detection means for evaluating the detected operational state and generating an operational state signal. Further, the evaluating means is connected to the means for reducing the pilot pressure to the first pump for controlling the displacement reduction depending on the operational state of the driveline.

BRIEF DESCRIPTION OF THE DRAWINGS

The invention will be described in greater hereinbelow, with reference to exemplary embodiments illustrated in the accompanying drawings, and wherein.

DETAILED DESCRIPTION

Figure 1:
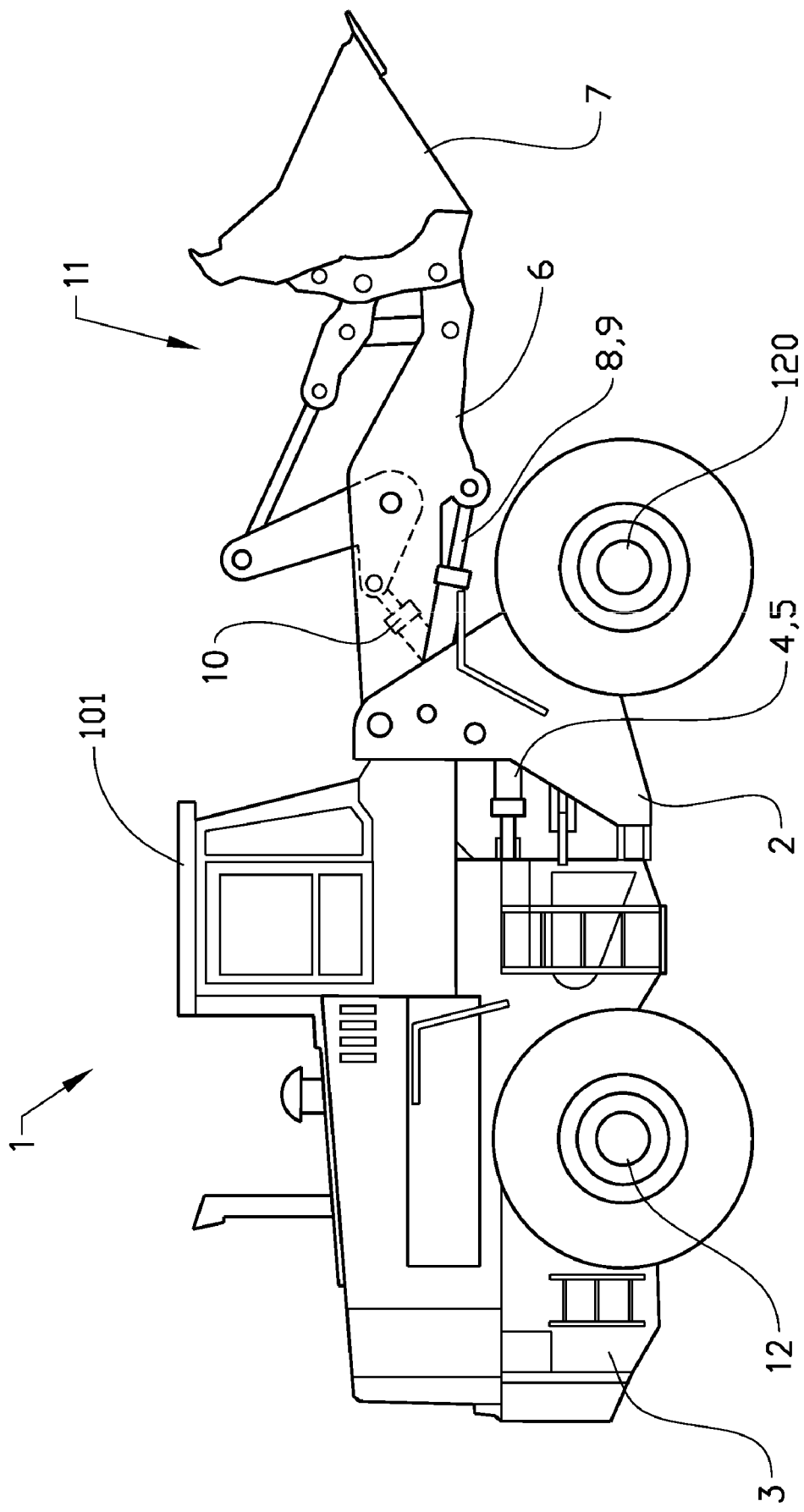
FIG. 1 is a side elevational view of a wheel loader.

FIG. 1 shows a wheel loader 1, the body of which comprises (includes, but is not necessarily limited to) a front body section 2 and a rear body section 3, and each has a pair of half shafts 12, 120. The rear body section 3 comprises a cab 101. The body sections are connected to each other in such a way that they can pivot. The body sections 2, 3 can pivot in relation to each other around a vertical axis by means of two actuators in the form of hydraulic cylinders 4, 5 arranged between the two sections. The hydraulic cylinders 4, 5 are thus arranged to turn the wheel loader 1.

The wheel loader 1 comprises an equipment attachment 11 for handling objects or material. The equipment attachment 11 comprises a load-arm unit 6 and an implement 7 in the form of a bucket fitted on the load-arm unit. A first end of the load-arm unit 6 is pivotally connected to the front vehicle section 2. The implement 7 is connected to a second end of the load-arm unit 6.

The load-arm unit 6 can be raised and lowered relative to the front section 2 of the vehicle by means of two second actuators in the form of two hydraulic cylinders 8, 9, each of which is connected at one end to the front vehicle section 2 and at the other end to the load-arm unit 6. The bucket 7 can be tilted relative to the load-arm unit 6 by means of a third actuator in the form of a hydraulic cylinder 10, which is connected at one end to the front vehicle section 2 and at the other end to the bucket 7 via a link-arm system.

Figure 2:
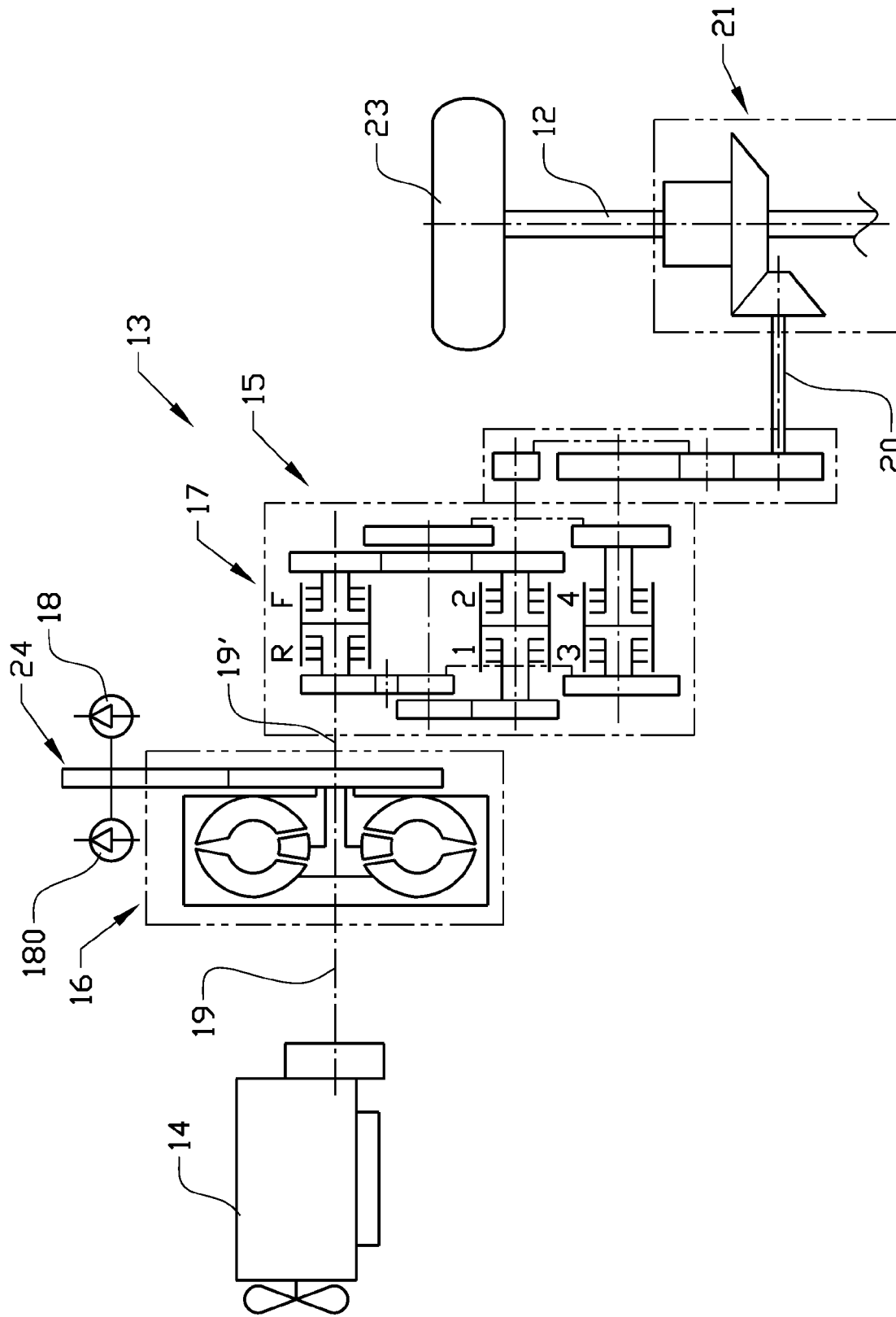
FIG. 2 is a schematic illustrating an exemplary embodiment of a driveline for a wheel loader.

FIG. 2 schematically illustrates an example of the wheel loader's 1 driveline 13. The driveline 13 comprises an internal combustion engine 14 (in the form of a diesel engine), an automatic gearbox 15 and a hydrodynamic torque converter 16. Advantageously, the engine comprises a turbocharger 77. The gearbox 15 consists of an electrically controlled automatic gearbox of the power shift type. The gearbox 15 comprises a forward and reverse gear 17.

FIG. 2 also shows two pumps 18, 180 in the wheel loader's hydraulic system for supplying the hydraulic cylinders 4, 5, 8, 9, 10 with hydraulic fluid. The pumps 18, 180 (like the torque converter 16) are driven by an output shaft 19 from the engine 14. In the illustrated embodiment, the pumps 18, 180 are drivingly connected between the torque converter 16 and the gearbox 15. More specifically, the pumps 18, 180 are driven by a torque converter output shaft 19 via a transmission 24. An output shaft 20 from the gearbox 15 leads to a differential gear 21, which is drivingly connected to the half-shafts 12 on which the vehicle's driving wheels 23 are arranged.

Figure 3:
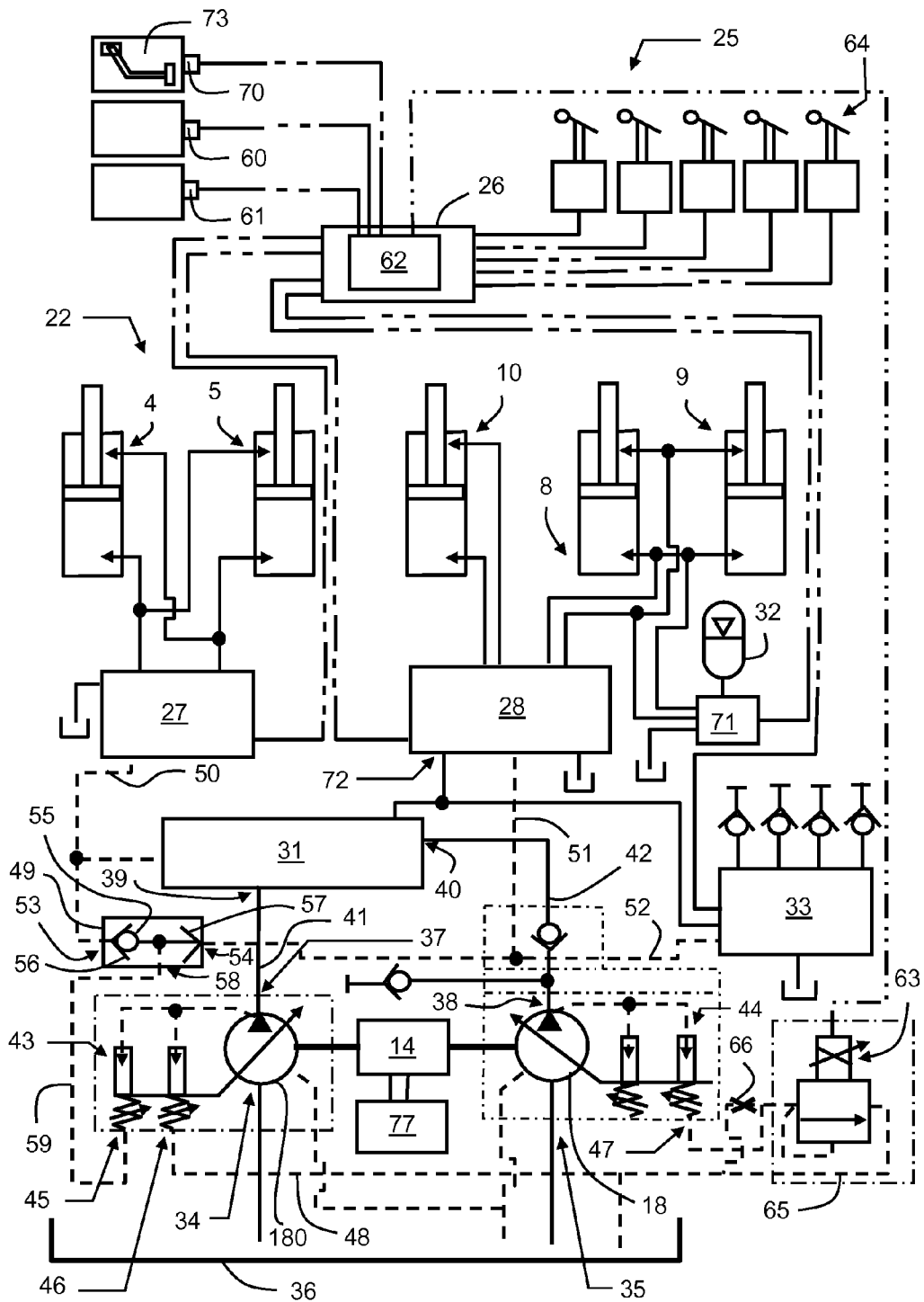
FIG. 3 is a diagrammatic illustration of a preferred embodiment of an arrangement for controlling a wheel loader according to the present invention.

FIG. 3 illustrates an embodiment of an arrangement 25 for controlling the wheel loader 1. The solid lines indicate main hydraulic conduits, while the dashed lines indicate pilot hydraulic conduits and the lines with a longer dash followed by two shorter dashes indicate lines for electric signals.

It is schematically shown in FIG. 3 that the pumps 18, 180 are drivingly connected to the engine 14.

The control arrangement 25 comprises a control unit 26, typically taking the form of a computer. A number of electric operating levers 64 arranged in the cab are connected to the control unit 26, and this is adapted to handle the signals from the levers. A number of electrically controlled hydraulic valve units 27, 28 in a hydraulic system 22 are electrically connected to the control unit 26 and hydraulically connected to the hydraulic cylinders 4, 5, 8, 9, 10 for regulating the reciprocating work of these. The first and second pumps 18 and 180 are respectively provided in order to supply the hydraulic cylinders 4, 5, 8, 9, 10 with hydraulic oil through the hydraulic valve units 27, 28. Each of the valve units 27, 28 comprise a directional control valve (not shown). The directional control valve has a pair of service passages that are connected to opposite ends of each of the double-acting hydraulic cylinders.

The hydraulic system 22 further comprises a valve unit 31 arranged between the pumps 18, 180 and the actuators 4, 5, 7, 8, 9 for controlling a flow of hydraulic fluid supplied to the actuators from said pumps. The valve unit comprises a prioritizing valve connected between the pumps 18,180 and the electric valves 27, 28. This prioritizing valve unit 31 is adapted for prioritizing steering hydraulics over lifting hydraulics.

An accumulator 32 with an associated valve unit 71 is connected to the loading cylinders 8, 9 in such a way that spring-action characteristics are obtained when the vehicle is driven with a loaded implement.

The signals from the electric operating levers 64 may be converted in a characteristic way in the control unit 26 and are then sent as output signals to the valve units 27, 28 in the form of electric pilot hydraulic valves, which in turn control the hydraulic cylinders 4, 5, 8, 9, 10.

Another valve unit 33 is indicated in FIG. 3. This valve unit 33 is intended to regulate the supply of hydraulic oil to an actuator of an implement and is coupled hydraulically to the pumps 18,180 through the prioritizing valve unit 31 and electrically to the control unit 26. The actuator of the implement can consist of, for example, a working cylinder of the gripping arms for moving these relative to one another or a working cylinder of the fork implement for relative movement of the two legs. The prioritizing valve unit 31 is also adapted to prioritize the steering hydraulics over the hydraulics for the implement concerned.

Both pumps 18, 180 have variable displacement. The hydraulic output by the pumps can thereby be controlled. The pumps 18, 180 feed hydraulic fluid to the actuators 4, 5, 8, 9, 10 and the associated loads coupled thereto. The pumps 18, 180 are provided so as to supply fluid to the control valves 27, 28 through fluid supply conduits.

Each of the pumps 18, 180 has a main inlet 34 and 35, respectively, connected to a sump 36 and a main outlet 37 and 38, respectively, connected to an inlet port 39, 40 of the control valve unit 31 through fluid supply conduits 41, 42.

A displacement control arrangement 43 and 44, respectively, is arranged at each pump 18, 180 for controlling the displacement thereof. The pump 18, 180 includes a swash plate being rotatable for varying pump displacement. The displacement control arrangement 43, 44 is hydraulically activated and comprises a mechanical element coupled to the swash plate for rotating the same and set it in a desired position. The displacement control arrangement 43, 44 works against spring force. The displacement control arrangement 43, 44 comprises a pilot inlet port 45 and 47, respectively. The displacement control arrangement 43, 44 is operative to increase the displacement of the pumps 18, 180 in response to receipt of respective increased pressure signals.

The hydraulic system 22 is load sensing and the pump displacement is therefore automatically controlled by a pilot pressure signal representing a load exerted on the system. In other words, the displacement of the first pump 18 is controlled by a load signal (pressure signal) representing an actual load. Thus, both pumps 18, 180 have their displacements controlled automatically in response to the requirement of various hydraulic functions.

The first pump 18 and the second pump 180 are hydraulically interconnected so that the pilot pressure is supplied to the input pilot port 45 of the second pump 180. An output pilot port 46 of the second pump 180 is connected to the input pilot port 47 of the first pump 18 through a hydraulic fluid conduit 48.

The displacement control arrangement 43 of the second pump 180 is connected to the inlet port 45 so that it controls the pump displacement depending on the input pilot pressure. The displacement control arrangement 44 of the first pump 18 is connected to the inlet port 47 so that it controls the pump displacement depending on the input pilot pressure.

The hydraulic system 22 further comprises shuttle valve means 49 operable for routing the larger fluid pressure existing at the output ports of the valve units 27, 28, 33 to the pump displacement control arrangements 43, 44 to thereby automatically control the pumps 18, 180 to satisfy the highest demand of the loads associated with the valve units 27, 28, 33. The pumps 18, 180 are hydraulically controlled to deliver an output pressure equal to such highest load pressure plus the load sensing pressure drop of the valve unit 27, 28, 33 associated with the load. For example, the pumps may be adapted to deliver a pressure of 25 bar higher than the load pressure.

More specifically, pilot conduits 50, 51, 52 connect the outlet ports of the control valve units 27, 28, 33 to first and second inlet ports 53, 54 of the shuttle valve 49. The shuttle valve 49 comprises a ball 55, which is arranged in a central space, and two opposite seats 56, 57 for the ball 55, each associated with one of the first and second inlet ports 53, 54. Each seat 56, 57 is arranged so that the ball 55 will block the respective inlet port 53, 54. The shuttle valve comprises an outlet port 58 connected to the inlet ports 53, 54 by the central space. In this way, the greater of the pressures in the pilot conduits connected to the inlet ports 53, 54 will act on the ball 55 and seat the ball in the opposite seat so that the larger of the pressures in the pilot conduits is communicated to the outlet port 58. The outlet port 58 of the shuttle valve 49 is connected, by a further pilot fluid conduit 59, to the displacement control arrangement 43 of the second pump 180.

For example, when the operator wants to lift the load-arm unit 11, he operates the specific control lever 64 associated with this function. The valve unit 28 associated with the lift cylinders 8, 9 will then start opening. The valve unit 28 is arranged to first open a port to the conduit 51 connected to the shuttle valve 49. The pressure of the lift cylinders 8, 9 will then be forwarded to the second pump 180 via the conduit 59 connected to the inlet port 45. The second pump 180 will now deliver a flow so that the output pressure from the second pump will be a specific differential higher, for example 25 bar, than the lift cylinder pressure.

The pressure from the lift cylinder 8, 9 will be forwarded from the second pump outlet port 46 to the inlet port 47 of the first pump 18. The first pump 18 will in the same way as the second pump 180 deliver a flow so that the output pressure from the first pump 18 will be a specific differential higher, for example 25 bar, than the lift cylinder pressure.

When the valve unit 28 further opens, a main inlet port 72 of the valve unit 28 will open so that hydraulic fluid flow from the pumps 18, 180 is delivered from the pumps to the lift cylinder.

The control arrangement 25 comprises means 60, 61, 70 for detecting an operational state of the driveline 13 of the work vehicle. The detection means 60, 61, 70 (sensors) may be adapted to sense a reduction of a value of the operational state, for example a change in the engine speed, resulting from excessive hydraulic loads, and producing parameter signals in response to the detected operating state. The control unit 26 is connected to the detection means 60, 61, 70 and comprises means 62 for evaluating the detected operational state and generating an operational state signal. The evaluating means comprises software code for performing the evaluation. Thus, it is programmed with certain algorithms.

The evaluating means 62 is connected to means 63 for reducing the pilot pressure signal to the first pump 18 for controlling the displacement reduction depending on the operational state of the driveline. More specifically, the pilot pressure signal is reduced to a pressure level below the load pressure resulting in that the displacement of the first pump is regulated down to zero. The means 63 for reducing the pressure signal to the first pump 18 is connected to the evaluation means 62 for receiving the operational state signal and reduce the pressure signal depending on the operational state signal.

The detection means comprises means 60 for detecting an engine parameter. The engine parameter detection means 60 include a boost pressure sensor located at the inlet manifold of the engine downstream of the turbocharger, an ambient pressure sensor and an engine speed sensor.

The engine speed sensor may be a magnetic pick-up device sensitive to the movement of a gear tooth in the engine, which is proportional to crankshaft speed. The boost pressure sensor and the ambient pressure sensor are preferably pulse-width modulated pressure sensors of a type well known in the art producing signals having duty cycles proportional to sensed pressure levels.

According to a first embodiment, the engine speed is sensed. When the engine speed falls to a predetermined minimum, the control unit 26 will output a signal with a level as a function of the detected engine speed. The detection means may also comprise means 70 for detecting the position of an accelerator pedal 73. Therefore, as an alternative, the control unit 26 will output a signal with a level as a function of both the detected engine speed and the detected position of the accelerator pedal 73.

According to a second embodiment, the turbocharger pressure is sensed. When the turbocharger pressure falls to a predetermined minimum, the control unit 26 will output a signal with a level as a function of the detected turbocharger speed. As an alternative, the control unit 26 will output a signal with a level as a function of both the detected turbocharger pressure and the detected position of the accelerator pedal 73.

According to a third embodiment, a driveline torque or output power is sensed. In this embodiment the engine torque is sensed. The pressure in a clutch in the gear box is used as a measure of the engine torque. Such clutch pressure signals are directly related to the torque being transmitted by the clutch to the wheels and by the wheels to the ground. When the torque falls to a predetermined minimum, the control unit 26 will output a signal with a level as a function of accessible engine torque. As an alternative, the control unit 26 will output a signal with a level as a function of both accessible engine torque and the detected position of the accelerator pedal 73.

The detection means further comprises means 61 for detecting a gear state in the gear box 15. More specifically, the detection means 61 detects a neutral state in the gear box 15. If the driver uses the hydraulic system 22 for a certain work operational when the vehicle is standing still, the driver normally puts the gear in the neutral state. Thus, in such a case, the engine is not used for propelling the vehicle. Thus, when a neutral state is detected, there is no need for destroking/disconnecting the first pump 18. Therefore, according to a further embodiment, when a neutral state is detected, the control unit 26 will not initiate destroking/disconnection of the first pump 18 independent of the engine speed.

Further, in a certain work situation, the driver may want a higher engine speed and he therefore depresses the accelerator pedal 73. The means 70 detects the position of the accelerator pedal 73 and at a certain predefined depression (suitably substantially corresponding to a desired full gas), the control unit 26 will produce a signal to the pilot pressure reducing means 63 in order to regulate the first pump displacement down (or disconnecting the pump). Thus, there is no requirement for the engine speed to be substantially decreased (close to engine cut out) for regulating the pump displacement down. Instead, the first pump displacement may be regulated down at a comparably low pilot pressure (system load) in order to increase the engine speed for a different reason.

The control unit 26 is programmed to activate the means 63 for reducing the pilot pressure signal to the first pump 18. More specifically, the pilot pressure signal reducing means 63 is formed by a solenoid-operated valve arranged in a branch conduit 65 connected to the pilot conduit 48 connecting the second pump outlet port 46 and the first pump inlet port 47. Thus, the pilot pressure signal reducing means 63 will control the hydraulic load signal to a pressure level corresponding to the electric signal from the control unit 26. The branch conduit 65 is connected to the sump 36. The hydraulic pilot signal will thus be drained to the sump 36 if the load pressure level is higher than the regulated pressure. The first pump 18 will then be destroked (the displacement of the first pump 18 will be reduced to zero and will not deliver any hydraulic fluid flow).

A flow restrictor 66, or orifice, is arranged on the conduit 48 connecting the output pilot port 46 of the second pump 180 and the input pilot port 47 of the first pump 18. The flow restrictor 66 is arranged upstream of the means 63 for reducing the pressure signal to the first pump 18. Because of the flow restrictor 66, the second pump 180 can maintain its pressure level and thereby continue to deliver fluid flow. This is due to the fact that a flow will continuously be guided from the hydraulic cylinder to the pilot pressure inlet port 45 for the second pump 180. The flow is large enough for saturating the orifice 66.

When there is no need for reducing the power of the hydraulic system, the control unit will send a high electric signal to the solenoid valve 63 so that its opening pressure is higher than the maximum pump pressure.

When the control unit 26 regulates the solenoid valve 63 to a certain extent, the first pump 18 will be disconnected (stroked down) if the load pressure is larger than the regulated pressure level. The first pump 18 will be connected (and delivering fluid) as long as the load pressure is smaller than the regulated pressure level.

When the driveline is in a neutral state, an upper engine speed limit boundary may be used for activating the first pump. Thus, when the detected engine speed reaches the upper engine speed limit boundary, the control unit 26 will send a signal to the solenoid valve 63 for deactivating the same so that it does not influence the load pressure from the hydraulic cylinder independently of whether the above described methods of controlling the solenoid valve 63 based on the operational parameter of the driveline is in operation or not.

Further, in case the engine speed is reduced to a predefined lower critical level, the control unit 26 sends a signal to the solenoid valve 63 to reduce the pilot input pressure to the first pump and thereby disconnect the pump.

The ambient atmospheric pressure may further be sensed and used as an input for determining the level of manipulation of the input pressure signal to the first pump.

The invention is also directed to a computer program comprising code means for performing the method steps described above when the program is run on a computer. The computer program is loaded in a memory in the control unit 26. The computer program may be sent to the control unit by wireless technique, for example via the internet.

The invention is further directed to a computer program product comprising program code means stored on a computer readable medium for performing the method described above when the program product is run on a computer. The computer readable medium may be in the form of a floppy disk or a CD-ROM.

The abovementioned control unit (ECU) 26 is also often called a CPU (Control Power Unit) or more plainly, a vehicle computer.

The invention has above been described for solving the problem of limiting hydraulic power output at low engine speeds. The invention may of course also be used for limiting hydraulic power also at high engine speeds, which may be necessary when an engine with "too little" power is used for an arrangement where "too high" power outputs are demanded.

It should be appreciated that the invention is in no way limited to the above described embodiments, but instead encompasses a number of alternatives and modifications which are possible without departing from the scope of the patent claims.

For example, the driveline described above in connection with FIG. 2 should only be regarded as an example. Any type of transmission may be used.

As an alternative or complement to the control methods described above, the detection means comprises means for detecting an engine fan torque or output power and the detected value is used to set the input pressure level to the first pump.

Further, output power may be sensed instead of torque in the methods described above.

The specific hydraulic system for controlling the first pump by manipulating its input pilot pressure may be solved in a number of different ways. One conduit for guiding the pilot pressure should be connected to an input pilot port of the first pump, one conduit for guiding the pilot pressure should be connected to an input pilot port of the second pump and the conduit leading to the first pump (to be regulated down) should have an orifice and a downstream bypass conduit to tank. Thus, the embodiment described and showed in FIG. 3 should only be regarded as an example.

What is claimed is:

1. An arrangement for controlling a work vehicle that includes a hydraulic system having at least one pump and of which a first pump is a variable displacement pump, the work vehicle including at least one actuator operatively driven by hydraulic fluid delivered from the first pump and the hydraulic system is of a load-sensing type in that pump displacement is controlled by a pilot pressure representing a load exerted on the system, said arrangement comprising:

a pressure reducing means for reducing pilot pressure delivered to the first pump so that said pump's displacement is regulated down when there is a need for limiting hydraulic power consumption, said hydraulic system including at least two variable displacement pumps for delivering hydraulic fluid to the actuator, and at least one of said variable displacement pumpsbeing a second pump, the displacement of which is controlled by a pilot pressure representing the load exerted on the system in a non-manipulated form.

2. The arrangement as recited in claim 1, wherein said pressure reducing means reduces the pilot pressure to said first pump to an extent that said pump does not deliver any hydraulic fluid flow.

3. The arrangement as recited in claim 1, further comprising conduits for conveying pilot pressure and which are connected both to an input pilot port of the first pump and to an input pilot port of said second pump and a flow restrictor arranged on the conduit to the input pilot port of the first pump and said flow restrictor being arranged upstream of said means for reducing the pilot pressure to said first pump.

4. The arrangement as recited in claim 1, wherein said pressure reducing means comprises a valve that in an activated state is adapted to at least partly route the pilot pressure in a conduit bypassing said first pump.

5. The arrangement as recited in claim 1, wherein each pump has an associated hydraulically controlled arrangement for controlling the displacement of the respective pump and the displacement control arrangement controls the pump displacement depending on the input pilot pressure.

6. The arrangement as recited in claim 1, wherein each pump is operatively driven by an engine arranged for propelling the vehicle.

7. The arrangement as recited in claim 6, further comprising detection means for detecting an operational state of a driveline of the work vehicle and evaluating means connected to the detection means for evaluating the detected operational state and generating an operational state signal.

8. The arrangement as recited in claim 7, wherein said evaluating means is connected to said pressure reducing means for reducing the pilot pressure to the first pump for controlling the displacement reduction depending on the operational state of the driveline.

9. The arrangement as recited in claim 7, wherein said detection means comprises means for detecting an engine speed.

10. The arrangement as recited in claim 7, wherein said detection means comprises means for detecting a turbocharger pressure.

11. The arrangement as recited in claim 7, wherein said detection means comprises means for detecting an engine torque or output power.

12. The arrangement as recited in claim 7, wherein said detection means comprises means for detecting a gear state in a vehicle gear box.

13. The arrangement as recited in claim 7, wherein said detection means comprises means for detecting a position of an accelerator pedal.

14. The arrangement as recited in claim 1, wherein at least one of said actuators is arranged to move an implement of the work vehicle.

15. A method of controlling a work vehicle having a hydraulic system for operating at least one actuator, said method comprising:

sensing a load exerted on the hydraulic system and controlling displacement of a first pump having variable displacement by means of a pilot pressure representing a system load, said first pump operatively driving the actuator by delivering hydraulic fluid thereto and reducing the pilot pressure to the first pump in case the hydraulic power needs to be limited, said hydraulic system including at least two variable displacement pumps for delivering hydraulic fluid to the actuator, and at least one of said variable displacement pumps being a second pump, the displacement of which is controlled by a pilot pressure representing the load exerted on the system in a non-manipulated form.

16. The method as recited in claim 15, wherein the pilot pressure to the first pump is reduced to such an extent that the first pump does not deliver any hydraulic fluid flow.

17. The method as recited in claim 15, wherein the first pump is operatively driven by an engine arranged for propelling the vehicle.

18. The method as recited in claim 15, wherein an operational state of a driveline of the work vehicle is detected, the detected operational state then being evaluated and an operational state signal being generated for controlling the pump displacement reduction depending on the operational state of the driveline.

19. The method as recited in claim 18, wherein an engine speed is detected.

20. The method as recited in claim 18, wherein a turbocharger pressure is detected.

21. The method as recited in claim 18, wherein an engine torque or output power is detected.

22. The method as recited in claim 18, wherein a position of an accelerator pedal is detected.

23. The method as recited in claim 18, wherein a gear state in a vehicle gear box is detected.

24. A computer software program product recorded on a computer readable medium, said software program product being executable on a computer for implementing the method as recited in claim 15.

25. An arrangement for controlling a work vehicle that includes a hydraulic system having at least one pump and of which a first pump is a variable displacement pump, the work vehicle at least one actuator operatively driven by hydraulic fluid delivered from the first pump and the hydraulic system is of the load-sensing type in that pump displacement is controlled by a pilot pressure representing a load exerted on the system, said arrangement comprising:

a pressure reducing means for reducing pilot pressure delivered to the first pump so that said pump's displacement is regulated down when there is a need for limiting hydraulic power consumption, said hydraulic system including at least two variable displacement pumps for delivering hydraulic fluid to the actuator, said arrangement further comprising conduits for conveying pilot pressure and which are connected both to an input pilot port of the first pump and to an input pilot port of a second pump and a flow restrictor arranged on the conduit to the input pilot port of the first pump and said flow restrictor being arranged upstream of said means for reducing the pilot pressure to said first pump.

* * * * *